(12) United States Patent
Weissman

(10) Patent No.: US 7,479,933 B2
(45) Date of Patent: Jan. 20, 2009

(54) STEREOSCOPIC DISPLAY APPARATUS PARTICULARLY USEFUL WITH LCD PROJECTORS

(76) Inventor: Yitzhak Weissman, 3a Kashani Street, Tel Aviv (IL) 69499

( * ) Notice: Subject to any disclaimer, the term of this patent is extended or adjusted under 35 U.S.C. 154(b) by 281 days.

(21) Appl. No.: 10/542,552

(22) PCT Filed: Apr. 7, 2003

(86) PCT No.: PCT/IL03/00291

§ 371 (c)(1),
(2), (4) Date: Jul. 18, 2005

(87) PCT Pub. No.: WO03/087884

PCT Pub. Date: Oct. 23, 2003

(65) Prior Publication Data

US 2006/0087734 A1    Apr. 27, 2006

Related U.S. Application Data

(60) Provisional application No. 60/441,159, filed on Jan. 21, 2003, provisional application No. 60/442,903, filed on Jan. 28, 2003.

(51) Int. Cl.
*G09G 5/00* (2006.01)
*H04N 15/00* (2006.01)
*G02F 1/1335* (2006.01)

(52) U.S. Cl. ............... 345/9; 348/54; 348/51; 349/15; 345/7

(58) Field of Classification Search .......... 345/7.8, 345/9; 348/42, 57, 58; 349/43
See application file for complete search history.

(56) References Cited

U.S. PATENT DOCUMENTS 5,121,983 A    6/1992 Lee (Continued)

OTHER PUBLICATIONS

ColorLink, Inc. ColorSelect web page, copyright 1999 ColorLink, Inc., "ColorSelect", pp. 1-2 as printed for scanning, available online at http://web.archive.org/web20001019090915/www.colorlink.com/products/select/select.html.*

(Continued)

*Primary Examiner*—Amare Mengistu
*Assistant Examiner*—Robert R Rainey

(57) ABSTRACT

Stereoscopic display apparatus, includes two projectors having inputs connectable to a source of digital data representing the color components of two stereoscopic images, and outputs outputting two optical beams each having a set of color components of different polarization states; a polarization preserving screen; an optical filter system using exclusively optical retarders for transforming the polarizations of the optical beams outputted by the two projectors into two color sets, in which all the color components of one set are polarized in one polarization state, and all the color components of the other set are polarized in an orthogonal polarization state; and means for stacking the two color sets onto the polarization preserving screen, such as to enable stereoscopic viewing of the two color sets via orthogonally polarized filters. Some of the described preferred embodiments involve switching of one color component, e.g., the green color component, at the inputs to the two projectors. In some described embodiments, the optical filter system outputs two beams stacked onto the screen, whereas in other described embodiments, the optical filter system produces a single output beam applied to the screen.

7 Claims, 16 Drawing Sheets

U.S. PATENT DOCUMENTS

| | | |
|---|---|---|
| 5,172,254 A | 12/1992 | Atarashi et al. |
| 5,187,754 A | 2/1993 | Currin et al. |
| 6,231,189 B1 | 5/2001 | Coluzzi et al. |
| 6,310,673 B1* | 10/2001 | Sharp .......................... 349/106 |
| 2001/0028416 A1* | 10/2001 | Divelbiss et al. .............. 349/43 |
| 2002/0033932 A1* | 3/2002 | Yamamoto et al. ........... 353/31 |
| 2002/0180933 A1* | 12/2002 | Ito ............................. 353/20 |

OTHER PUBLICATIONS

Woods "Optimal Usage of LCD Projectors for Polarized Stereoscopic Projection", Proc. SPIE, 4297:5-7, 2001. Abstract.

* cited by examiner

STEREOSCOPIC DISPLAY APPARATUS PARTICULARLY USEFUL WITH LCD PROJECTORS

RELATED PATENT APPLICATION

This application is a National Phase Application of PCT/IL03/00291 having International Filing Date of 7 Apr. 2003, which claims the benefit of U.S. Provisional Patent Application No. 60/441,159 filed 21 Jan. 2003, and U.S. Provisional Patent Application No. 60/442,903 filed 28 Jan. 2003. The contents of the above applications are all incorporated herein by reference.

FIELD AND BACKGROUND OF THE INVENTION

The present invention relates to stereoscopic display apparatus in which the stereo pair images are differentiated by their state of polarization. The invention is particularly useful with respect to LCD (liquid crystal display) projectors or projection engines, and is therefore described below in apparatus using such devices.

A stereoscopic display is made up from two superimposed images, representing the left-eye and the right-eye views, respectively. In order to create a stereoscopic effect, each eye of the viewer must be exposed only to its corresponding image. There are several known methods to achieve this, one of them being known as a "passive" method. In the passive method, the two stereoscopic images are polarized in mutually orthogonal polarization states. To view the display the observer wears special binoculars with appropriate polarization filters, such that each filter transmits efficiently to each eye the light of one image and rejects the light of the other.

A block diagram of a passive stereoscopic projection system is shown in FIG. 1. The image generator provides the stereoscopic contents via two electronic signals to the two projectors. The beam of each projector is manipulated by an appropriate optical filter to ensure that the two images that are displayed by the two projectors will be polarized orthogonally to each other. The two filters can be disjoint or combined in a single unit. Another possible design is shown in FIG. 2. In this design the filters are disposed internally between the projection engine of the projector and the projection lens, and their output is combined optically. In this design there is only one projection lens. This fact facilitates the setup and the use of the projection unit.

Two types of polarization states are normally used in stereoscopic displays: linear and circular. Linear polarization is most popular because linear polarizers are most common and normally less expensive than circular polarizers. However, filtering of linearly polarized images is sensitive to the viewer's head orientation. For this reason circular polarization is favored whenever the viewing is combined with motion.

If the output light of the projector is unpolarized, it is possible to create two orthogonally polarized images simply by mounting linear polarizers on the two projectors, oriented in such a manner that the angle between their polarization axes is 90°; see for example Andrew J. Woods, "Optimal Usage of LCD Projectors for Polarised Stereoscopic Projection", Proc. of SPIE Vol. 4297 (2001). This method is used with digital-light-processing (DLP) projectors but involves a loss of at least 50% of the light.

Many of the projectors used today are LCD (liquid crystal display) projectors. The output beam of LCD projectors is made up of three color components: red, blue and green. All three color components are linearly polarized, but the polarization direction of the red and the blue components is perpendicular to the polarization direction of the green component, as illustrated in FIG. 3. Such a beam will be referred to as "cross-polarized".

In general, when a polarizer is disposed in the output beam of an LCD projector, it will seriously distort the colors of the image. For instance, if the polarizing axis is aligned parallel to the polarization plane of the green light, all red and blue light will be absorbed, and only the green content of the image will be transmitted. The only way to polarize linearly all three colors in the same direction while preserving their relative intensities is to align the polarizer at 45° with respect to all three colors. But this method also results in the loss of at least 50% of the light since the intensity of all three colors will be reduced, equally, by at least 50%.

One can thus use the same method used to create mutually orthogonal images with DLP projectors also with LCD projectors. The only difference is the additional requirement to orient the polarization axes of the polarizers at 45° with respect to the polarization directions of the color components. This is illustrated in FIG. 4, where the reduced lengths of the arrows of the various color components indicate the light loss incurred by the use of polarizers.

LCD microdisplays, which serve as the image-generating element in LCD projectors, need polarized light to function properly. As the light sources used for these projectors (arc lamps) are unpolarized, much of their light is wasted and the optical efficiency is reduced. This tempted practitioners in the field to invent LCD projectors that can fully utilize the unpolarized light of the source. Such projectors with transmissive and reflective LCD microdisplays were described in Atarashi et al., U.S. Pat. No. 5,172,254 and Colucci et al., U.S. Pat. No. 6,231,189, respectively. Both utilize six LCD microdisplays, two for each color. Such projectors could be used for stereoscopic display, as each can accept two full-color images. The present invention focuses on using available off-the-shelf projectors or projection engines to avoid the high cost involved in development of new designs such as those described in the patents cited above.

OBJECTS AND BRIEF SUMMARY OF THE INVENTION

One object of the present invention is to provide stereoscopic display apparatus having advantages in the above respects. A more particular object of the present invention is to provide stereoscopic display apparatus which is optically efficient and which exhibits low cross talk between the left and right images.

According to a broad aspect of the present invention, there is provided stereoscopic display apparatus comprising: first and second projectors having inputs connectable to a source of digital data representing the color components of color sets of two stereoscopic images, each of said projectors having an output outputting an optical beam having a set of color components in which at least one color component of each color set is of an orthogonal polarization state with respect to the other color components of the respective set; a polarization preserving screen; a first optical polarization rectifier using exclusively optical retarders to manipulate the polarization states in the first projector in such manner that the polarization states of the different color components in the first projector are converted to a single first polarization state; a second optical polarization rectifier using exclusively optical retarders to manipulate the polarization states in the second projector in such manner that the polarization states of the different color components in the second projector are converted to a second single polarization state; the first and second single polarization states being mutually orthogonal; polarizing clean-up filters arranged for increasing the polarization ratio of the output beams; and stacking means for stacking the two color sets onto the polarization preserving screen such as to enable stereoscopic viewing of the two color sets via orthogonally polarized filters.

Preferably, the optical filter system includes, for each projector, a polarization rectifier which transforms a plurality of color components in different polarization states at the input into the same polarization state at the output by using exclusively the optical retarders for polarization manipulation. Two embodiments of polarization rectifiers are described. In one embodiment, the polarization rectifier includes a stack of optical retarders which align the polarizations of all color components. In second embodiment, the polarization rectifier includes: a splitter which separates the color components into two optical paths, a polarization transformer in at least one optical path which utilizes an optical retarder to transform the respective color component to another polarization state in such manner that mutually orthogonal polarization states are transformed to polarization states that are also mutually orthogonal; and a combiner which combines the two optical paths for stacking onto the polarization preserving screen.

The several embodiments of the invention, described below for purposes of example, differ considerably in many respects. They however share one common feature: all transformations of the main polarization states are done exclusively with optical retarders. This feature is fundamental to the present invention, as it allows the high optical efficiency.

As indicated earlier, the invention is particularly useful, and is therefore described below, with respect to LCD projectors outputting the red and blue color components in one polarization state, and the green color components in an orthogonal polarization state.

As will be described more particularly below, the foregoing features of the invention enable the construction of various types of stereoscopic display apparatus which are optically efficient and which exhibit low cross-talk between the left and right images.

Further features and advantages of the invention will be apparent from the description below.

BRIEF DESCRIPTION OF THE DRAWINGS

The invention is herein described, by way of example only, with reference to the accompanying drawings, wherein.

Figure 1:
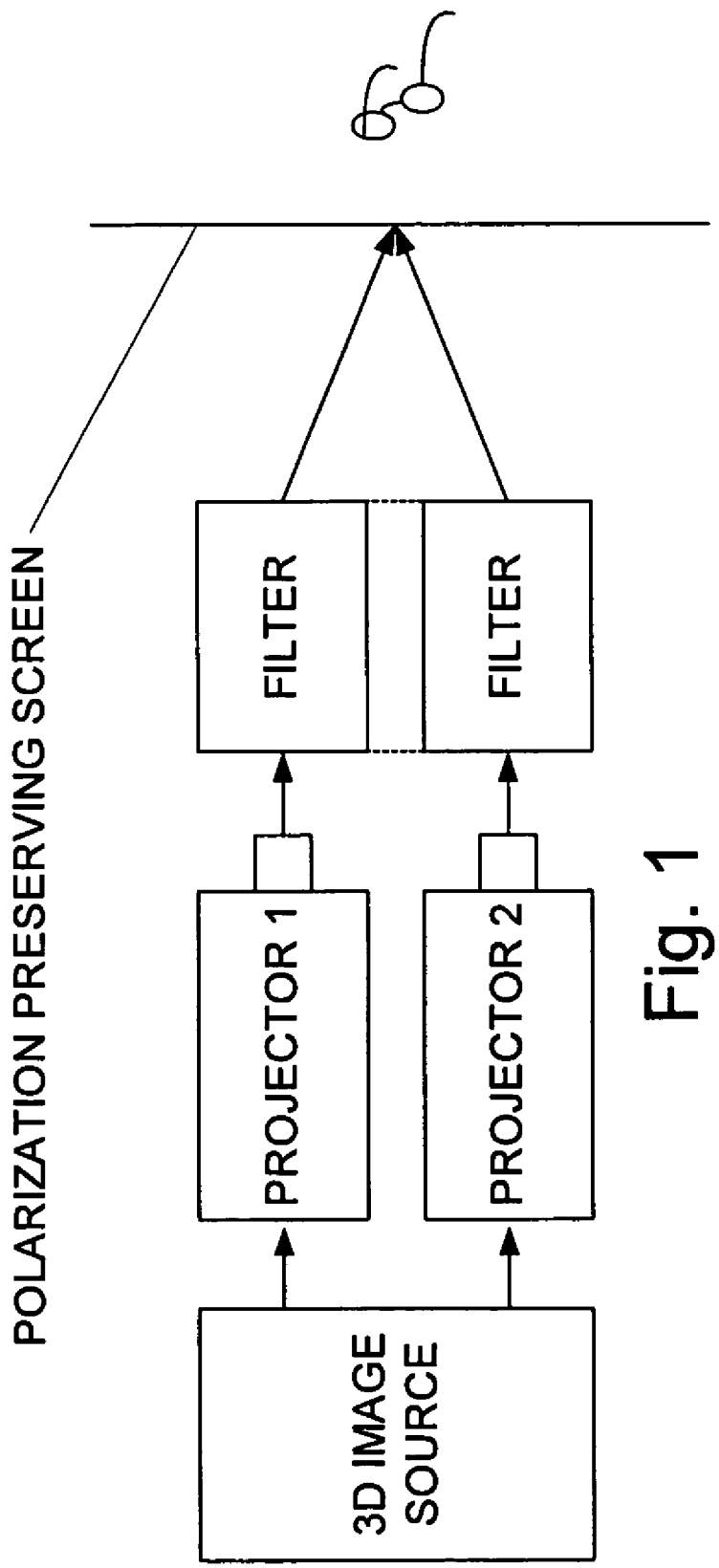
FIG. 1 is a block diagram of a passive stereoscopic projection with externally disposed optical filters systems.

It is to be understood that the foregoing drawings, and the description below, are provided primarily for purposes of facilitating understanding the conceptual aspects of the invention and various possible embodiments thereof, including what is presently considered to be a preferred embodiment. In the interest of clarity and brevity, no attempt is made to provide more details than necessary to enable one skilled in the art, using routine skill and design, to understand and practice the described invention. It is to be further understood that the embodiments described are for purposes of example only, and that the invention is capable of being embodied in other forms and applications than described herein.

PRELIMINARY CONSIDERATIONS

General Requirements

Described below are several optical assemblies that can be used to create an optically efficient stereoscopic display in accordance with the present invention. These assemblies are referred to as "optical filter systems", or simply as "filters".

The primary function of the filter is to create two mutually orthogonal RGB (Red, Green, Blue) sets that are used to display the pair of stereoscopic images. In order to maintain low cost, the filters described here are designed for use with standard commercial LCD projectors. Such projectors cannot be used to create a stereoscopic display without a filter because they are polarized identically.

Another important factor of such filters is the filter optical transmission efficiency. The prior art polarizing filters used in stereoscopic display apparatus generally have only 50% efficiency. The filters described here have much higher efficiencies, which is achieved by manipulating the intrinsic polarization properties of the projectors.

Most of the intensity of a polarized beam is located in one polarization state, referred to as the "main" state. In nature, perfect polarization does not exist, and a certain amount of power of a polarized beam can be always found in the polarization state that is orthogonal to the main state. The polarization quality of a polarized beam may be measured by its polarization ratio. This is the ratio between the intensities of the main state and the orthogonal to the main polarization components of the beam. In passive stereoscopic displays, it is critical to have the polarization ratio in each image in the stereoscopic pair as high as possible. This is because the residual polarization components that are orthogonal to the main polarization direction cause cross talk between the left and the right stereoscopic images. In other words, a small amount of light from the right image reaches the left eye, and vice versa. This cross talk gives rise to a spurious effect, called "ghosting", which degrades the quality of the display.

In a typical commercial projector, the polarization ratio of the color components may be too low for stereoscopic applications. Thus, the output beams should have a higher polarization ratio than the input beams. The operation of increasing the polarization ratio is referred to as "clean-up". Special "clean-up" filters are described below reject the destructive polarization components.

The filters must also preserve the colors and the uniformity of the original images as much as possible.

The filters may be disposed externally to the projector, as shown in FIG. 1. This is the simplest utilization of filters because it does not require any modification in the projectors. However, in this arrangement the user has to adjust the zoom and the focus of two separate projection lenses, as well as correct relative image distortions caused by stacking two separate beams. This complicates the projection apparatus and its use.

Figure 2:
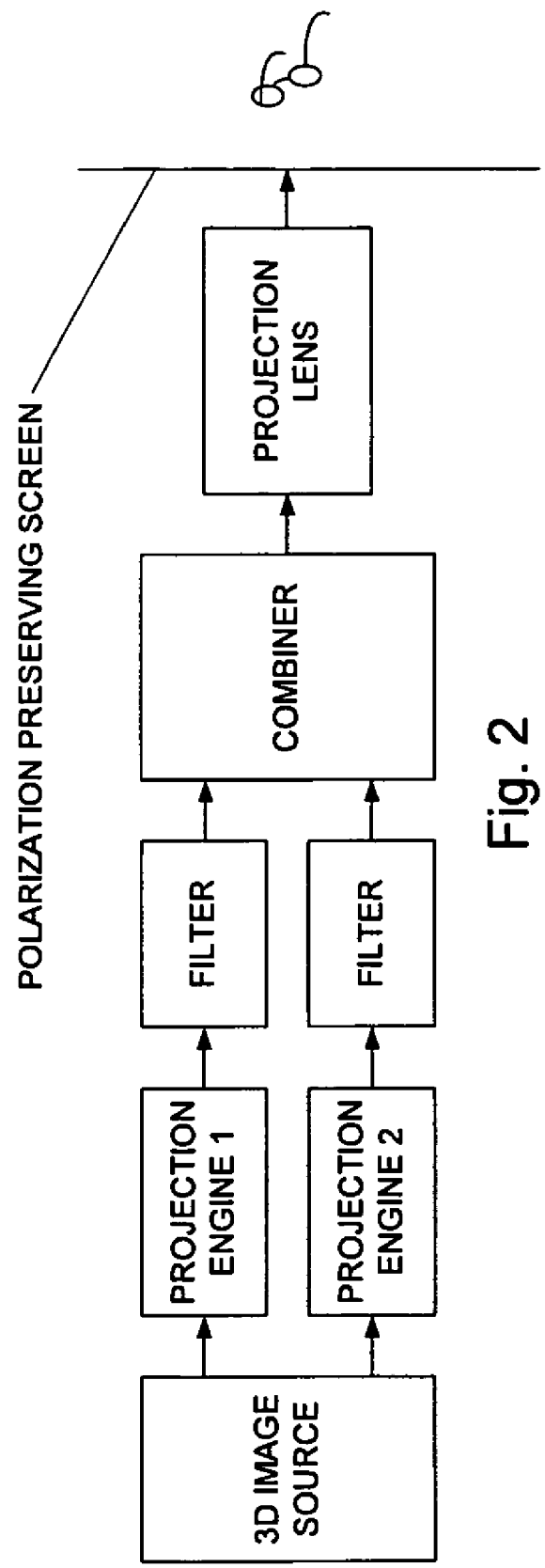
FIG. 2 is a block diagram of a projection system with internally disposed optical filters systems and a single projection lens.

The filters can be also disposed internally before the projection lens, as shown in FIG. 2. A projector without a projection lens is sometimes referred to as "projection engine". The FIG. 2 system has a single projection lens and is therefore more user-friendly. However, it is much more expensive to make such an apparatus as a special projection lens must be developed for it.

A projector beam is comprised of three color components. Each color component has two attributes: (1) color (red, green, or blue); and (2) polarization (either horizontal or vertical). A filter performs two functions on each beam component:

(i) Manipulation of the component polarization state; and (ii) Increase of the polarization ratio of the component (clean up).

Manipulation of the polarization state can be rotation (for linear polarization), or conversion from linear to circular polarization.

Figure 3:
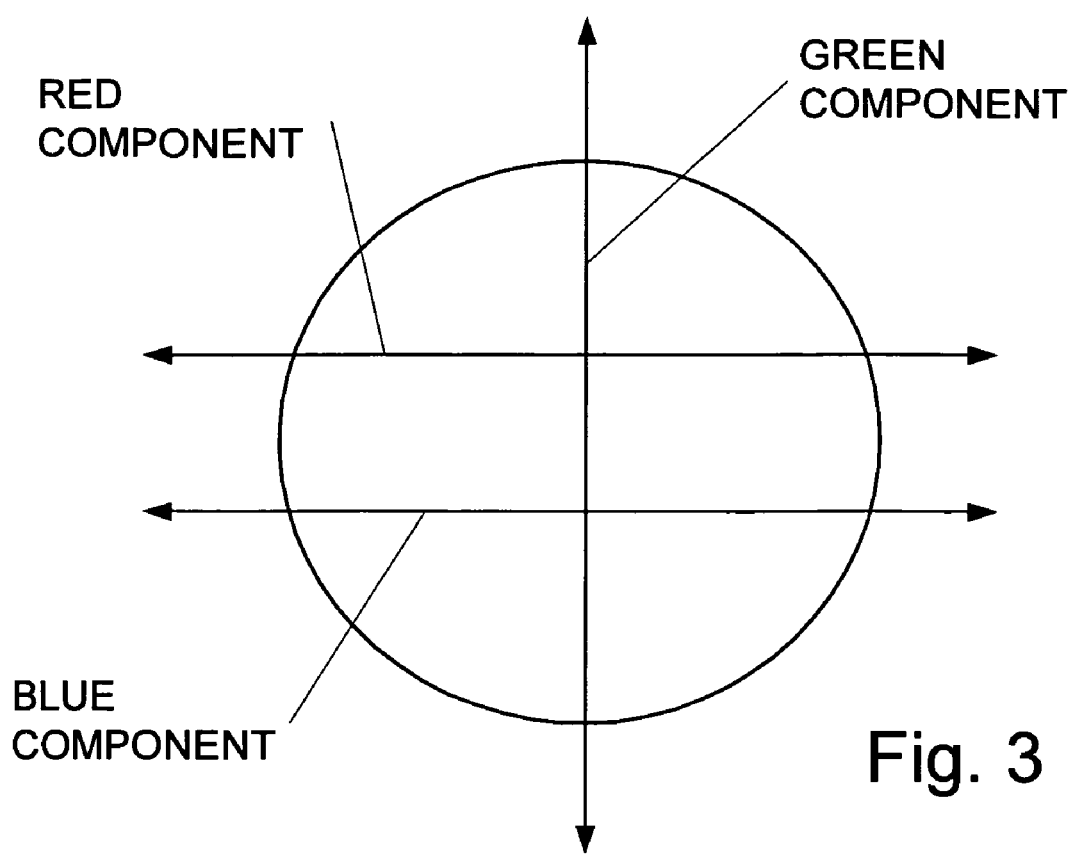
FIG. 3 illustrates the polarization directions of the color components in cross-polarized LCD projectors.
Figure 4:
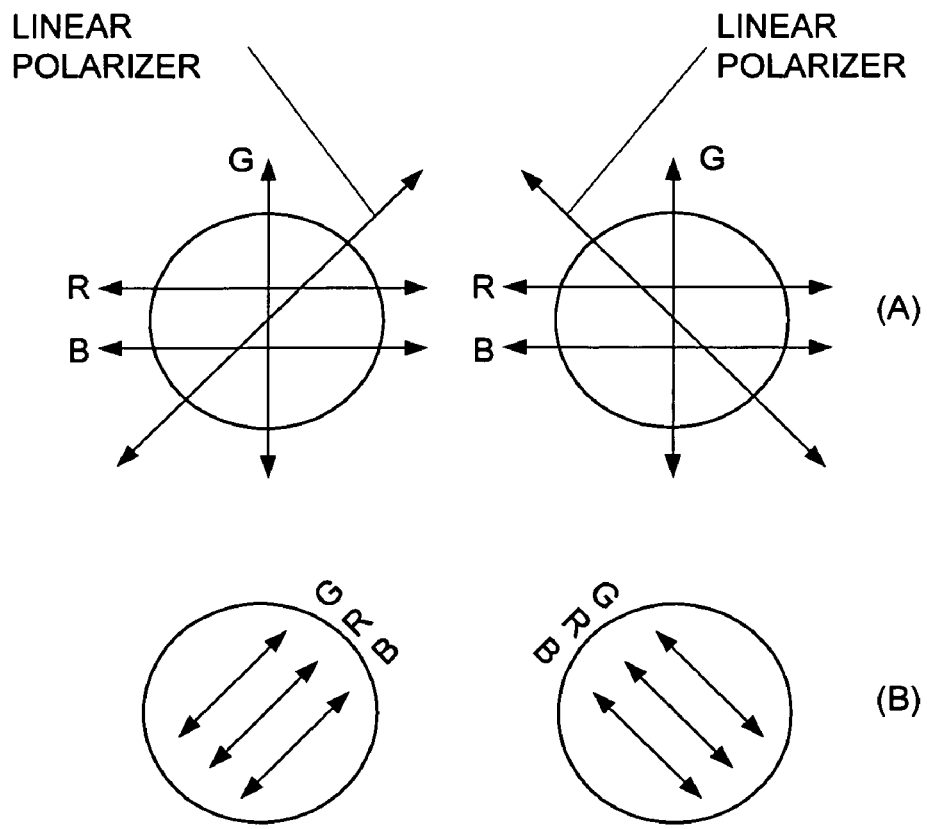
FIG. 4 diagrammatically illustrates the manner of creating two mutually orthogonal polarized beams in LCD projectors.

The polarization states inputted to the filter are denoted by the symbols $\alpha$ and $\beta$, and the output polarization states by $\gamma$ and $\delta$. The output polarization states are different, in general, from the input polarization states. State $\alpha$ is orthogonal to state $\beta$, and state $\gamma$ is orthogonal to state $\delta$. There are no general orthogonality relations between the input $(\alpha,\beta)$ states and the output $(\gamma,\delta)$ states. In the preferred embodiments of the invention described below, the projectors determine the input polarization states; in this case LCD projectors, which output the red and blue color components in one polarization state, and the green color component in an orthogonal polarization state, as illustrated in FIG. 3. The output polarization states are normally designed to fit the standard polarization filters used in stereoscopic glasses. In all the described preferred embodiments the optical filter system transforms, by utilizing exclusively optical retarders for polarization state manipulation, the optical beams outputted by the two projectors into two color sets in which all the color components of one set are polarized in one polarization state, and all the color components of the other set are polarized in an orthogonal polarization state, such as to enable stereoscopic viewing of the two color sets via orthogonally polarized filters.

The images corresponding to the two output beams of the filter will appear in general displaced and distorted relative to each other on the screen. The graphical contents of the output beams must be precisely stacked one on top of the other. This can be achieved either by optical means using optical beam splitters, or by proper image warping (in this case, a projective transformation) applied to the corresponding graphics content. In many cases, with a proper mechanical alignment the necessary image warping can be reduced to an operation known as "keystone correction". This image warping is a built-in feature in most modern projectors. In general, stacking by image warping is more flexible and less expensive than optical stacking.

DESCRIPTION OF PREFERRED EMBODIMENTS

Described below are two types of filters: filters based on polarization transformers, and filters based on polarization rectifiers.

Filters Including Two Polarization Transformers

Figure 5:
FIG. 5 is a block diagram illustrating the function of a polarization transformer.

A block diagram of a polarization transformer is shown in FIG. 5. This is an optical device that accepts at input a cross-polarized beam in mutually orthogonal polarization states $\alpha$ and $\beta$, and outputs also a cross-polarized beam but in possibly different mutually orthogonal polarization states $\gamma$ and $\delta$.

Of particular interest are polarization transformers with linear polarizations in both input and output. In this case, the only the function of the polarization transformer is simply to rotate the polarization directions of the input components by a certain angle. This can be achieved by an optical element known as "half-wavelength retarder". Another polarization transformer that may be used is a linear to circular polarization converter. This transformation is accomplished by an optical component known as "quarter-wavelength retarder".

Figure 6:
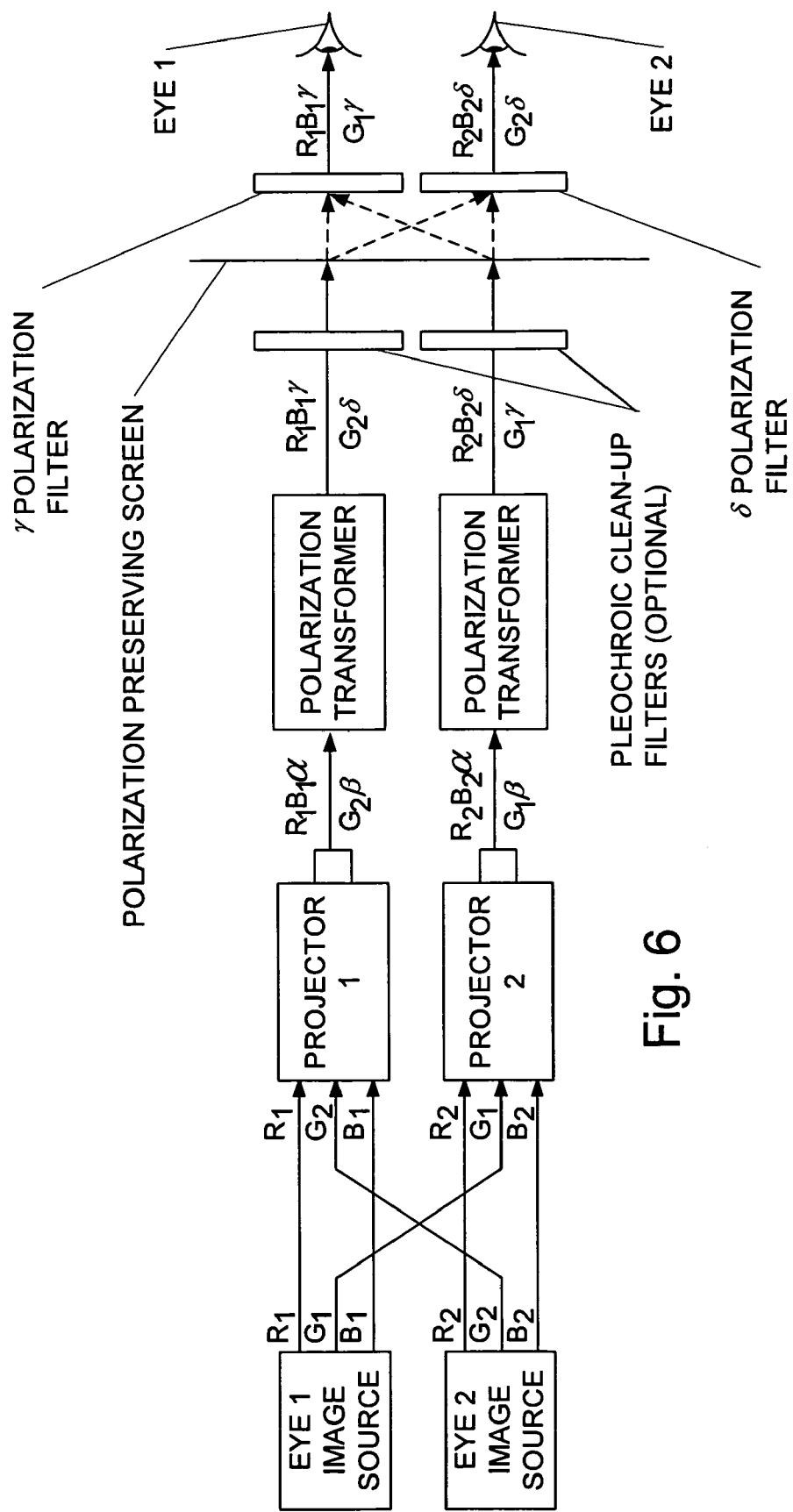
FIG. 6 is a block diagram of a stereoscopic projection system using two polarization transformers as optical filters with switching of the green color components at the input to the projectors.

A block diagram of a filter based on polarization transformers is shown in FIG. 6. The two eye image sources are connected to the projectors in such a manner that the green signal leads are crossed. Thus projector 1 accepts the red and the blue components of the eye no. 1 image, and the green component of the eye no. 2 image. Correspondingly, projector 2 accepts the red and the blue components of the eye no. 2 image, and the green component of the eye no. 1 image. The outputs of the two projectors are inputted to two different polarization transformers. The transformer of projector 1 transforms polarization state $\alpha$ to polarization state $\gamma$, and polarization state $\beta$ to polarization state $\delta$. The transformer of projector 2 transforms polarization state $\alpha$ to polarization state $\delta$, and polarization state $\beta$ to polarization state $\gamma$. The output beams of the filters are optionally cleaned up with special polarizers called "pleochroic", whose function will be explained below.

The images created on the polarization-preserving screen scatter their light in all directions; so bare eyes can see both images simultaneously. To excite the 3D sensation it is necessary that each eye will be exposed to its image only. This is achieved by disposing appropriate polarizing filters before the eyes. In the example shown in FIG. 6, the correct viewing conditions are created by disposing a $\gamma$ filter in front of eye no. 1, and a $\delta$ filter in front of eye no. 2.

Figure 7:
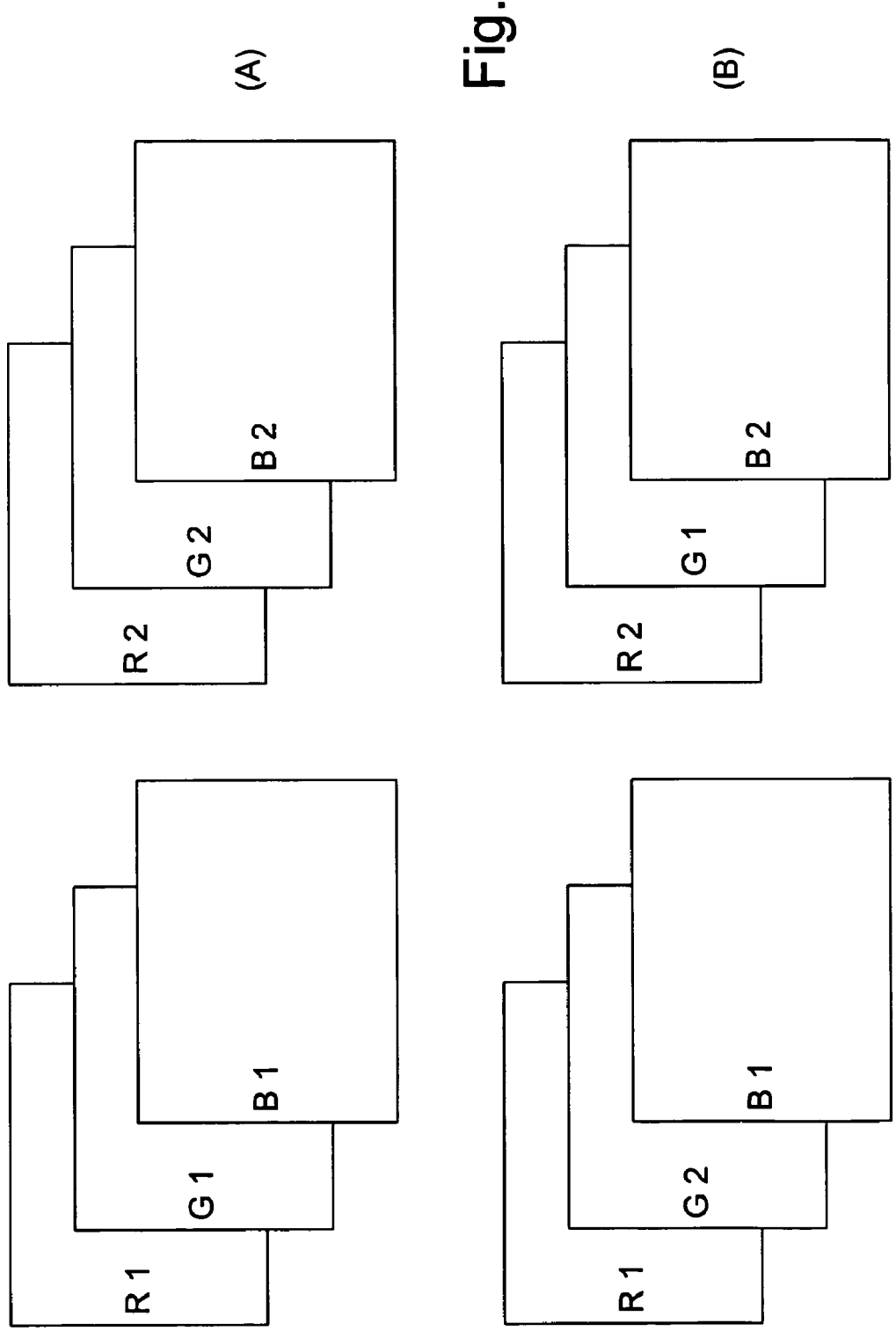
FIG. 7 illustrates another manner of switching the green content by pre-processing the inputted data.
Figure 8:
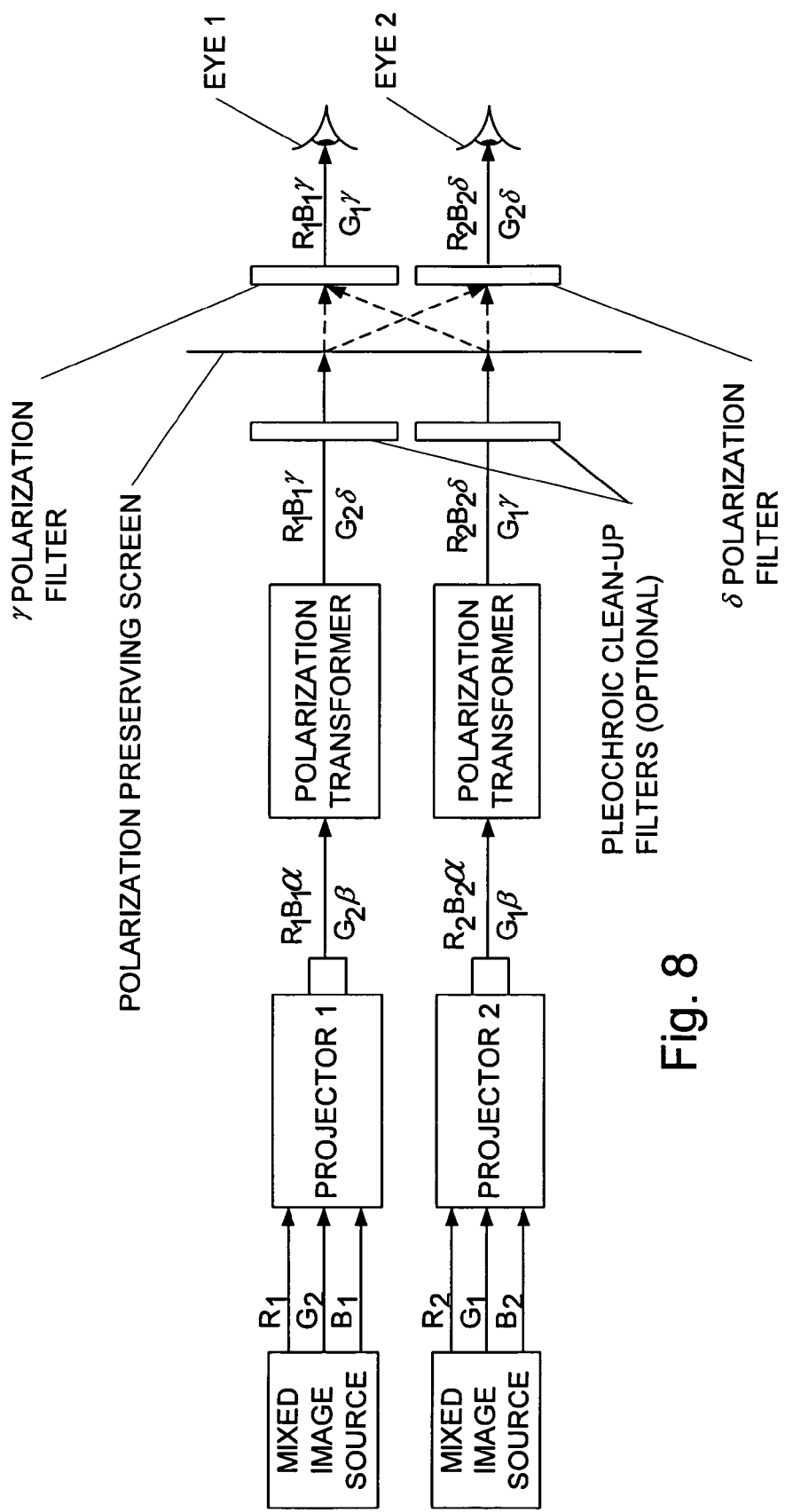
FIG. 8 is a block diagram of a stereoscopic projection system using two polarization transformers as optical filters displaying a preprocessed content with green components switched.

Another option for the utilization of this filter is to use a preprocessed stereoscopic content in which the green component was switched between the two images, as shown in FIG. 7. FIG. 7(A) shows the original content, and FIG. 7(B) the same content with the green component switched. The processed images shown in FIG. 7(B) cannot be regarded as "left" and "right" images, as each image represents mixed content from both eyes. A block diagram of a polarization transformers filter using mixed image sources is shown in FIG. 8. This scheme does not need crossing of the wires carrying the green signal, because the green content was switched already by content preprocessing.

This method is easier and less expensive to implement than the hardware wire crossing. It is true that switching of the green content between the two stereoscopic images requires computing resources. However, switching the green signals requires perfect synchronization between the two video channels. This is generally unavailable, except in high-end and expensive equipment.

Figure 10:
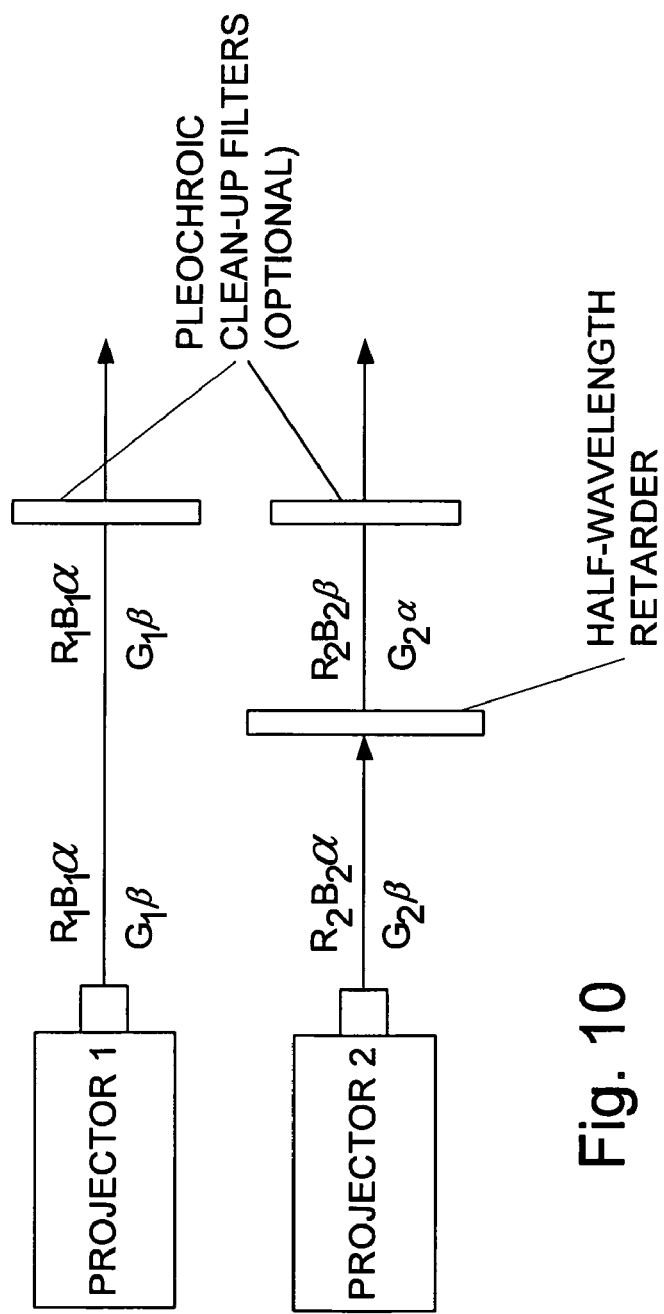
FIG. 10 shows a simple embodiment of the two polarization transformer optical filter system.

FIG. 10 shows a particularly simple implementation of the polarization transformer filter. In this implementation it is assumed that the polarization states $\alpha$ and $\beta$ are linear (as is the case in practice). The polarization transformer in the projector 1 path is omitted. The polarization transformer in the projector 2 path is a simple half-wavelength retarder. It is aligned in such a manner that it induces polarization states rotation by 90°. Thus polarization state $\alpha$ is transformed to polarization state $\beta$, and polarization state $\beta$ is transformed to polarization state $\alpha$. The reader can easily convince himself that the desired polarization structure of the output beams is indeed achieved.

This simple filter is described here more for the sake of illustration rather than as actual suggestion for commercialization. It has two disadvantages: the treatment of the two channels is not symmetrical, and the states $\alpha$ and $\beta$ do not generally match the standard polarized binoculars used for stereoscopic viewing. Asymmetry in the two channels may create artifact differences between the left and the right images, and degrade the display quality.

Beams with well-defined polarization can be cleaned up with regular polarizers, which are aligned in such a manner as to transmit the main polarization state of the beam while absorbing the residual radiation in the polarization state that is orthogonal to it. Cross-polarized beams do not have a well-defined polarization, and cannot be cleaned up with regular polarizers. Special types of polarizers, called "pleochroic" polarizers, can be used to clean up cross-polarized beams.

A pleochroic polarizer is an optical filter that transmits all light in one state of polarization, and absorbs the orthogonal state of polarization in a chosen spectral band. Such a filter acts as a polarizer for the chosen spectral band, and as a transparent window for all other light. For instance, a pleochroic filter can be made that absorbs green light in one state of polarization, and is transparent to all other light. Such a filter is called "magenta pleochroic". A filter can also be made that absorbs red and blue light in one state of polarization, and is transparent to all other light. Such filter is called "green pleochroic"

If the pleochroic filter is designed for linear polarization states, it will have a transmissive axis and an absorptive axis orthogonal to each other.

Figure 9:
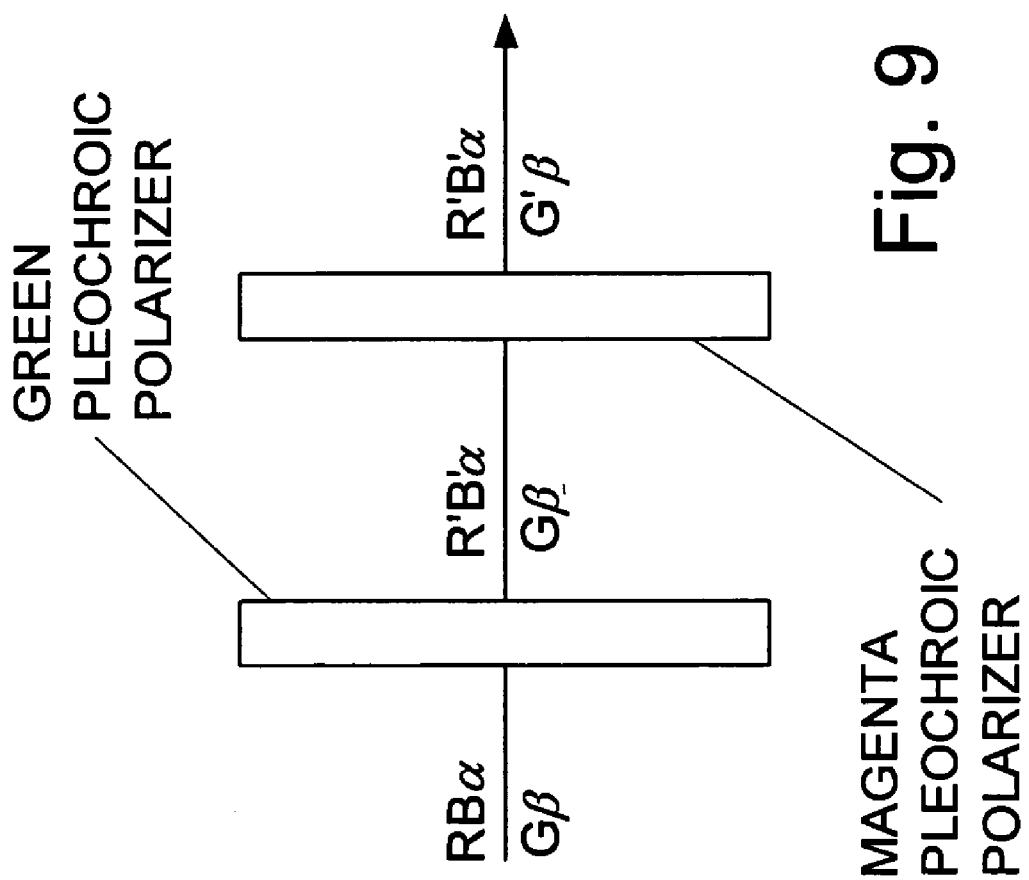
FIG. 9 diagrammatically illustrates the manner in which two pleochroic polarizers are used to clean up a cross polarized beam.

To clean up the green color component in a cross-polarized beam, a magenta pleochroic filter can be used. If the transmissive axis of this filter is aligned with the direction of the green color component main polarization, this color component will be cleaned-up while the other color components will remain intact. Similarly, a green pleochroic filter can be used to clean up the red and the blue components. Two such filters in series can clean up all three color components. This arrangement is shown in FIG. 9. The primed color components are color components that were "cleaned-up", or, in other words, their polarization ratio has been increased. Such a clean-up filter made up from one or more pleochroic polarizers will be referred to as a "pleochroic clean-up filter".

Normally, the green color component in projectors has much higher intensity than the other two color components. In addition, the human eye response to the green color is higher than to the other colors. The combination of these facts makes the green color dominant in projected images. Therefore, cleaning the green color only may be sufficient in many applications. Using only one pleochroic polarizer to clean up the beam reduces cost and losses.

Filters Including Two Polarization Rectifiers

Figure 11:
FIG. 11 illustrates diagrammatically the function of a polarization rectifier.

A polarization rectifier is an optical device that accepts two or more color components in different polarization states, and produces an output composed of all input components identically polarized. A block diagram of a polarization rectifier for a projector beam is shown in FIG. 11.

Figure 12:
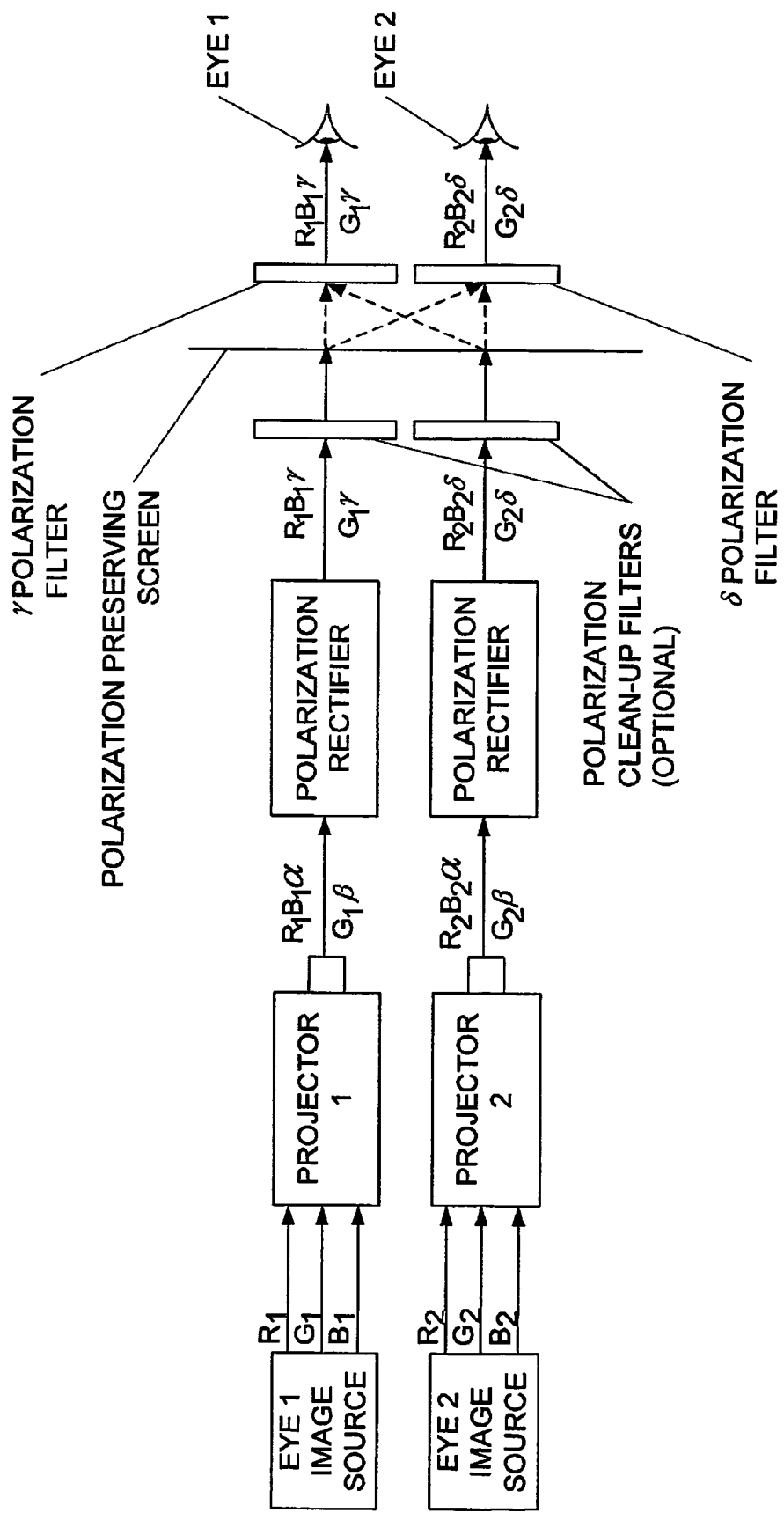
FIG. 12 is a block diagram of a stereoscopic projection system using two polarization rectifiers as optical filters.

A block diagram of two polarization rectifiers filter is shown in FIG. 12. The two images sources are coupled directly to the projectors. A different polarization rectifier processes the output of each projector. The polarization rectifier of projector 1 transforms both the $\alpha$ and the $\beta$ polarization states to another polarization state $\gamma$, and the polarization rectifier of projector 2 transforms both the $\alpha$ and the $\beta$ polarization states to yet another polarization state $\delta$, in such a manner that $\gamma$ and $\delta$ are mutually orthogonal. The output beams are optionally cleaned up by regular polarizers. It is seen that the correct viewing conditions are created by disposing a $\gamma$ polarization filter in front of eye no. 1, and a $\delta$ polarization filter in front of eye no. 2.

Figure 13:
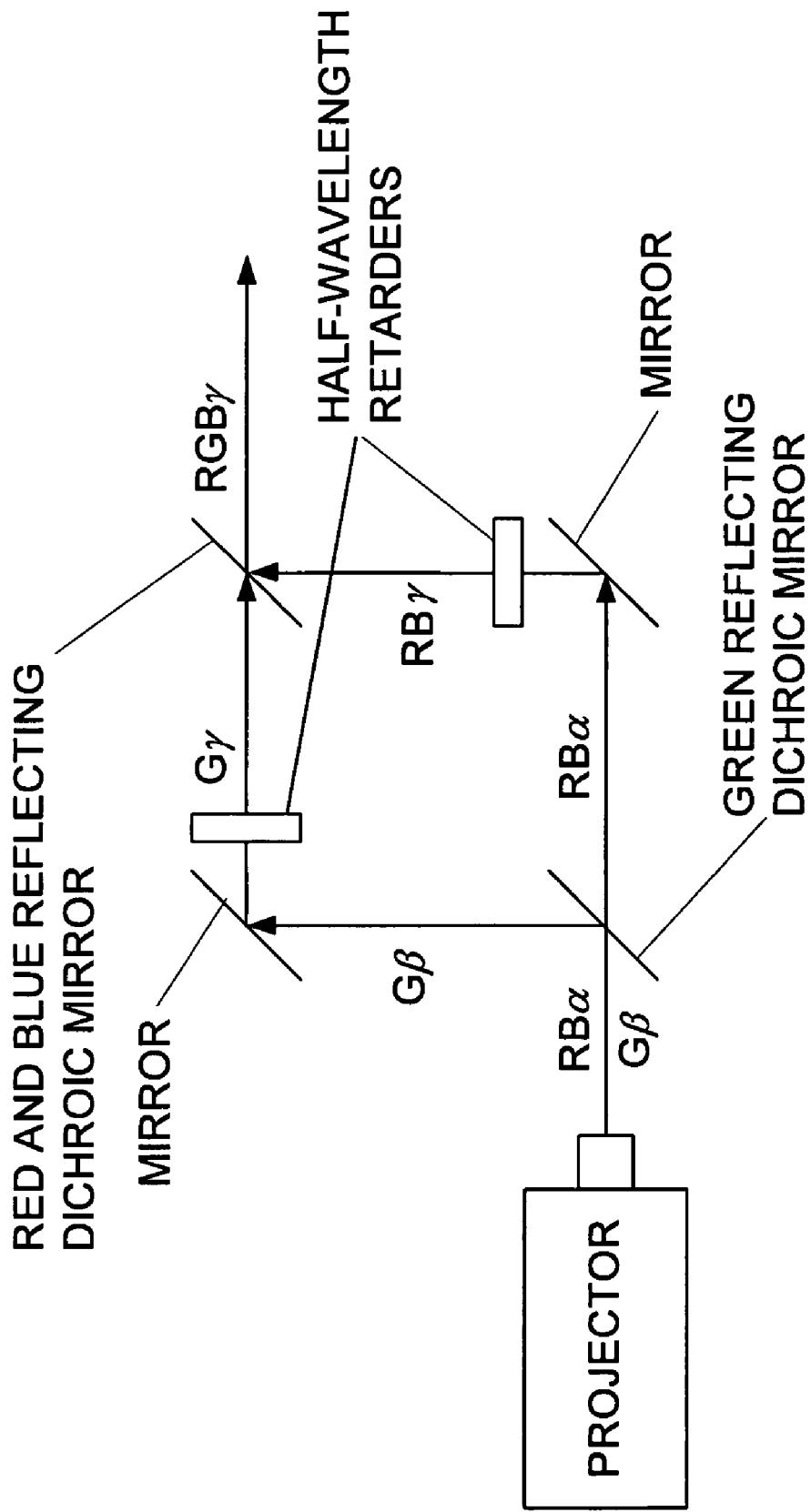
FIGS. 13 and 14 show preferred embodiments of a polarization rectifier.

A possible embodiment of a polarization rectifier is shown in FIG. 13. In this embodiment it is assumed that the input polarization states $\alpha$ and $\beta$ are linear, and that so is the output polarization state $\gamma$ too.

A green-reflecting dichroic mirror splits the polarization states of the input beam. This mirror has the property that it reflects the green light, and transmits the red and the blue light. A half-wavelength retarder rotates each one of the separated polarization states so that both acquire the same polarization state $\gamma$. The two color components, being now identically polarized are recombined by a red and blue reflecting dichroic mirror. The resultant output beam is made up of all three components polarized in state $\gamma$. The direction of state $\gamma$ can be controlled by the orientations of the half-wavelength retarders.

Readers familiar with related optical techniques will recognize that a polarization beam splitter can replace the green-reflecting dichroic mirror at the input of the polarization rectifier. Also, when general polarization transformers are used instead of the half-wavelength retarders, an arbitrary output polarization state $\gamma$ can be achieved.

Another device that can serve as a polarization rectifier for an LCD projector is a special stack of optical retarders as described, for example, by Sharp, U.S. Pat. No. 6,310,673. Sharp teaches, among other things, how to make a filter that will rotate the green color polarization direction by 90°, while keeping intact the polarization plane of the other color components. Such a filter has an axis, which has to be aligned with the red and blue colors polarization direction in order to achieve the desired effect. When such a filter is mounted in the proper orientation to receive a cross-polarized LCD beam, all colors will emerge polarized in the same direction. Such green rotating filters are manufactured by ColorLink (Boulder, Colo.) under the commercial name ColorSelect™

Figure 14:
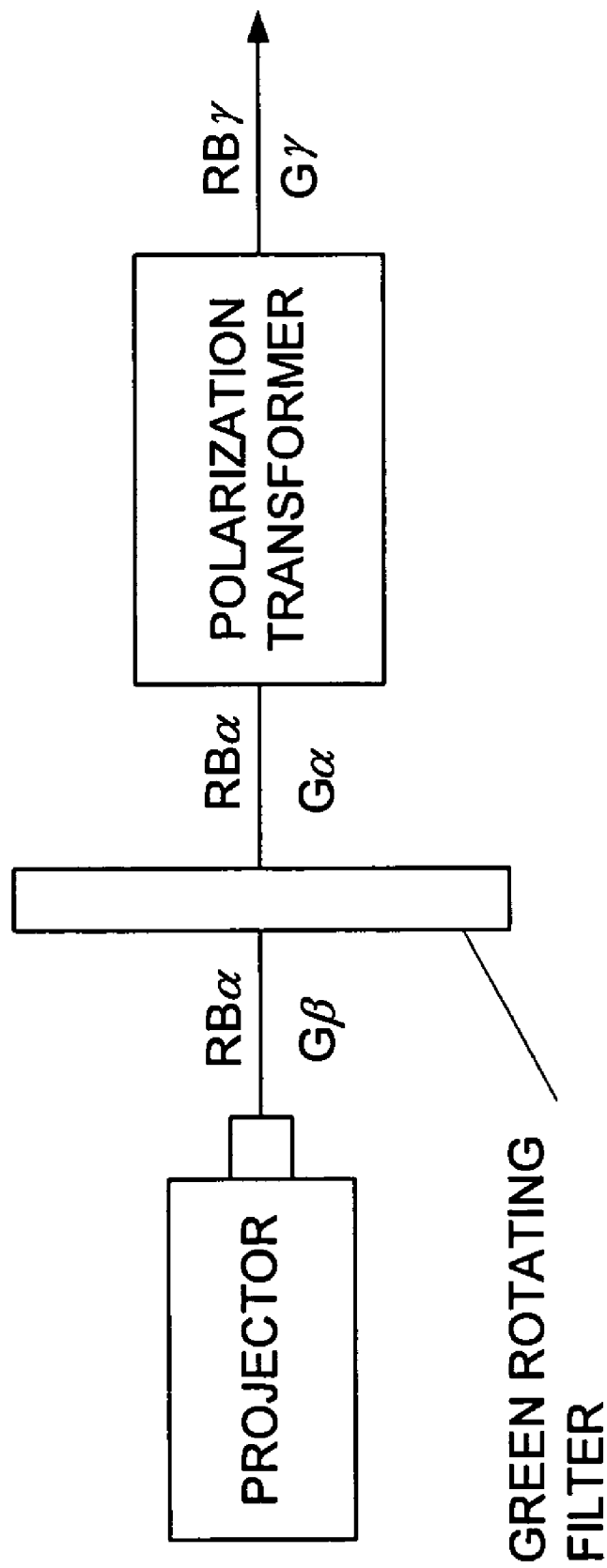

The ColorSelect™ filter alone cannot produce a general linear output polarization state, like the filter shown in FIG. 13. A polarization rectifier with an arbitrary linear output polarization state can be created by combining a ColorSelect™ filter with a polarization transformer, as shown in FIG. 14.

Figure 15:
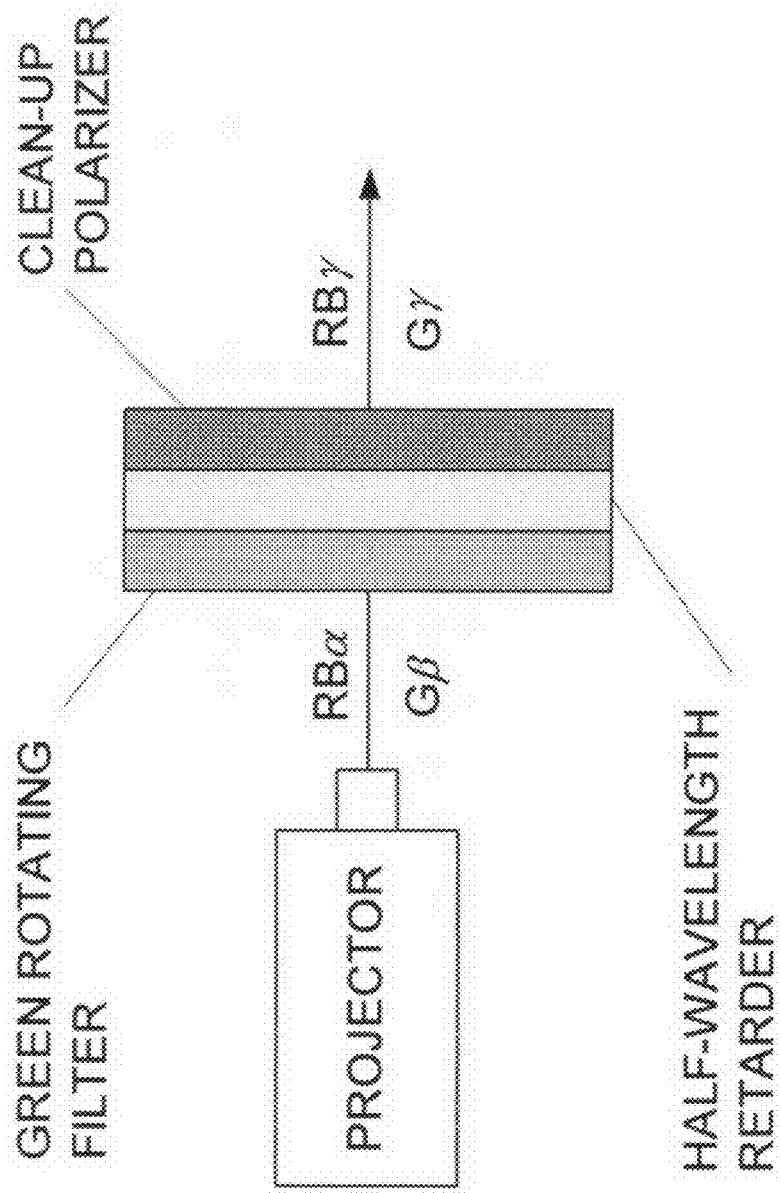
FIG. 15 shows a complete assembly of a polarization rectifier with a clean-up polarizer.
Figure 16:
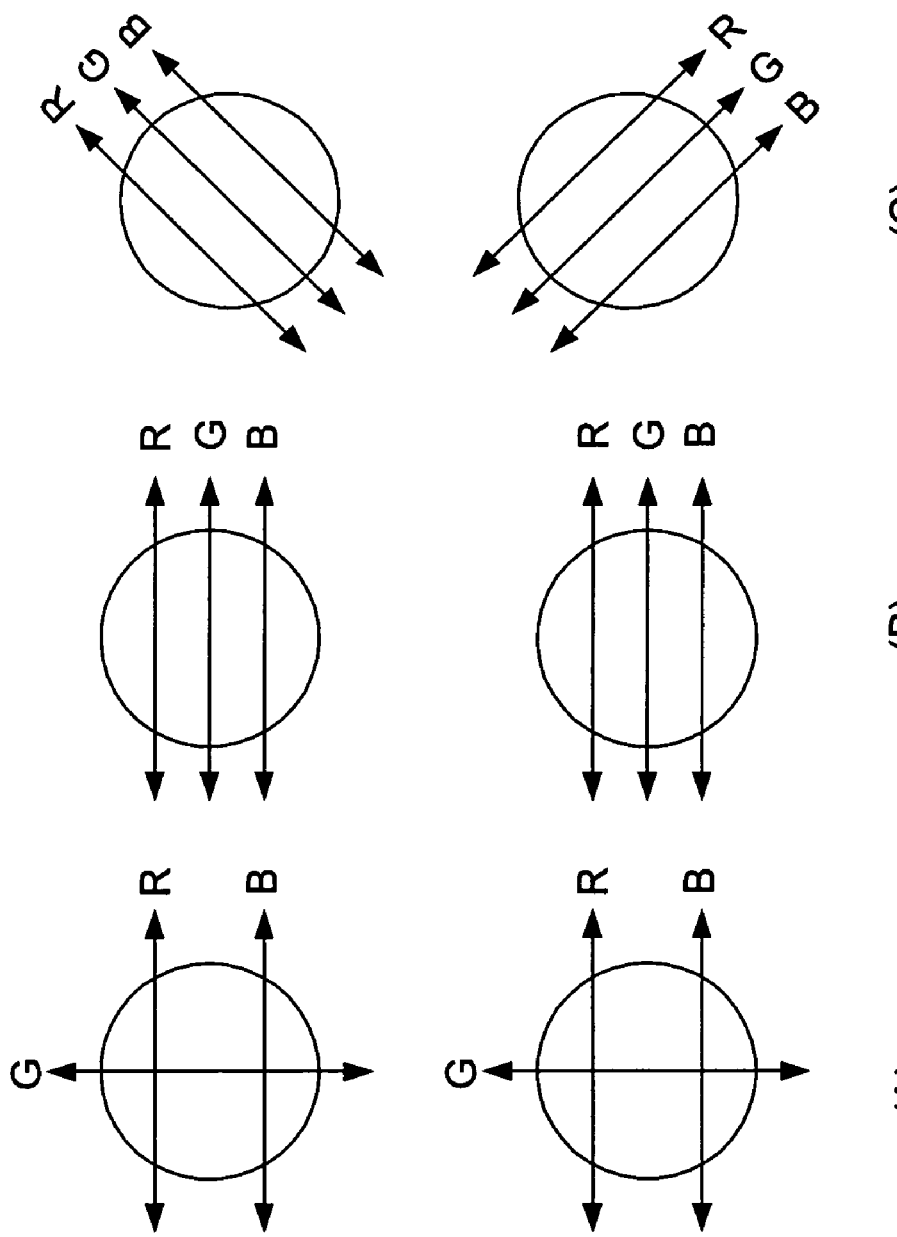
FIG. 16 illustrates the evolution of the polarization states in the two projector beams subject to the filters such as shown in FIG. 15.
Figure 17:
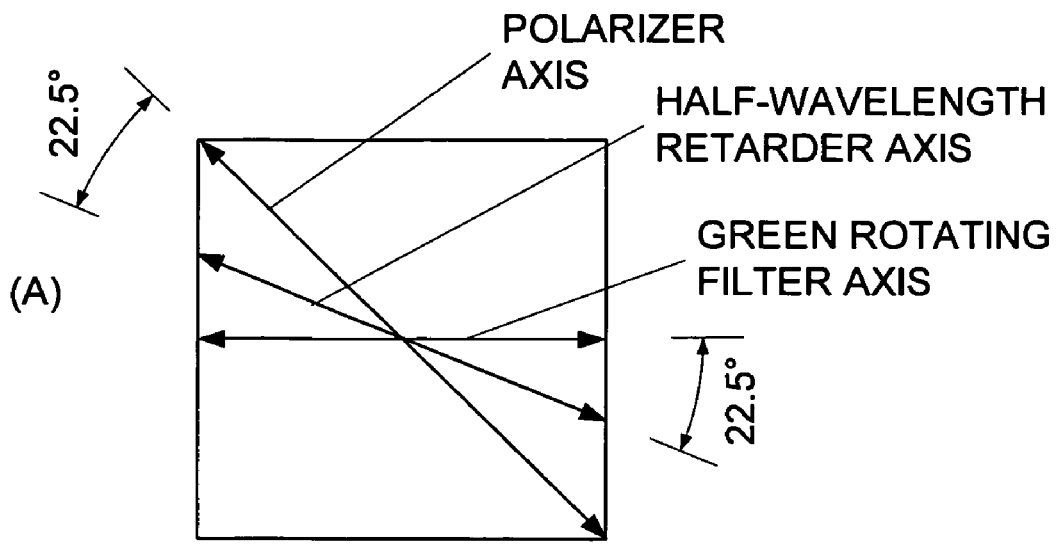
FIG. 17 shows the relative optical alignment of the three layers of the polarization rectifier shown in FIG. 15.
Figure 17:
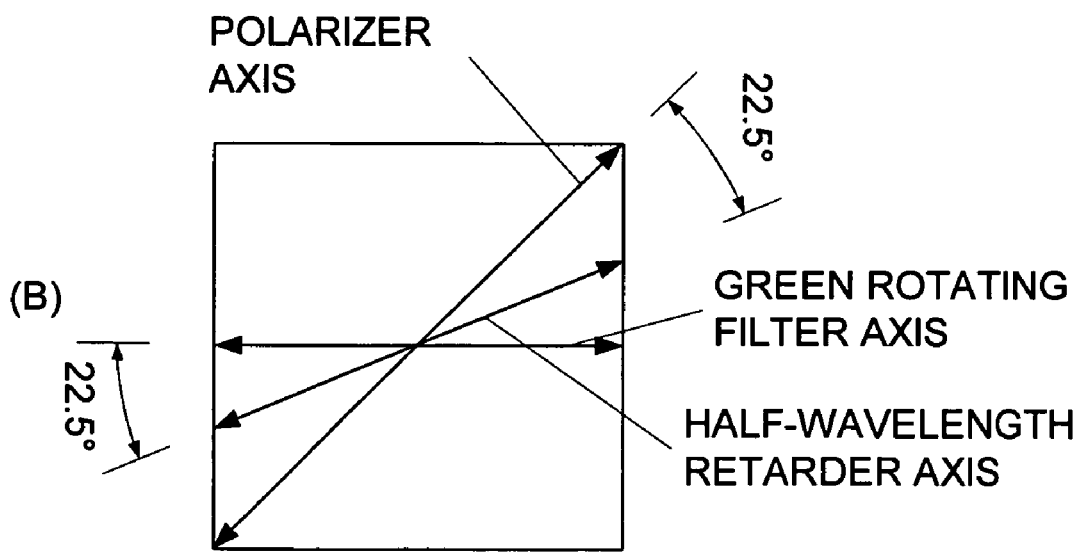

FIG. 15 shows a compact polarization rectifier, which incorporates a clean-up filter. It is made of three layers: a green-rotating ColorSelect™ filter, a half-wavelength retarder, and a linear polarizer. The function of two such devices that can be used for a two polarization rectifiers filter is illustrated in FIG. 16. FIG. 16(A) shows the original beams; FIG. 16(B) shows the beams after the ColorSelect™ filter; and FIG. 16(C) shows the beams after the half-wavelength retarder. The orientations of the three layers in both devices is shown in FIG. 17.

Figure 18:
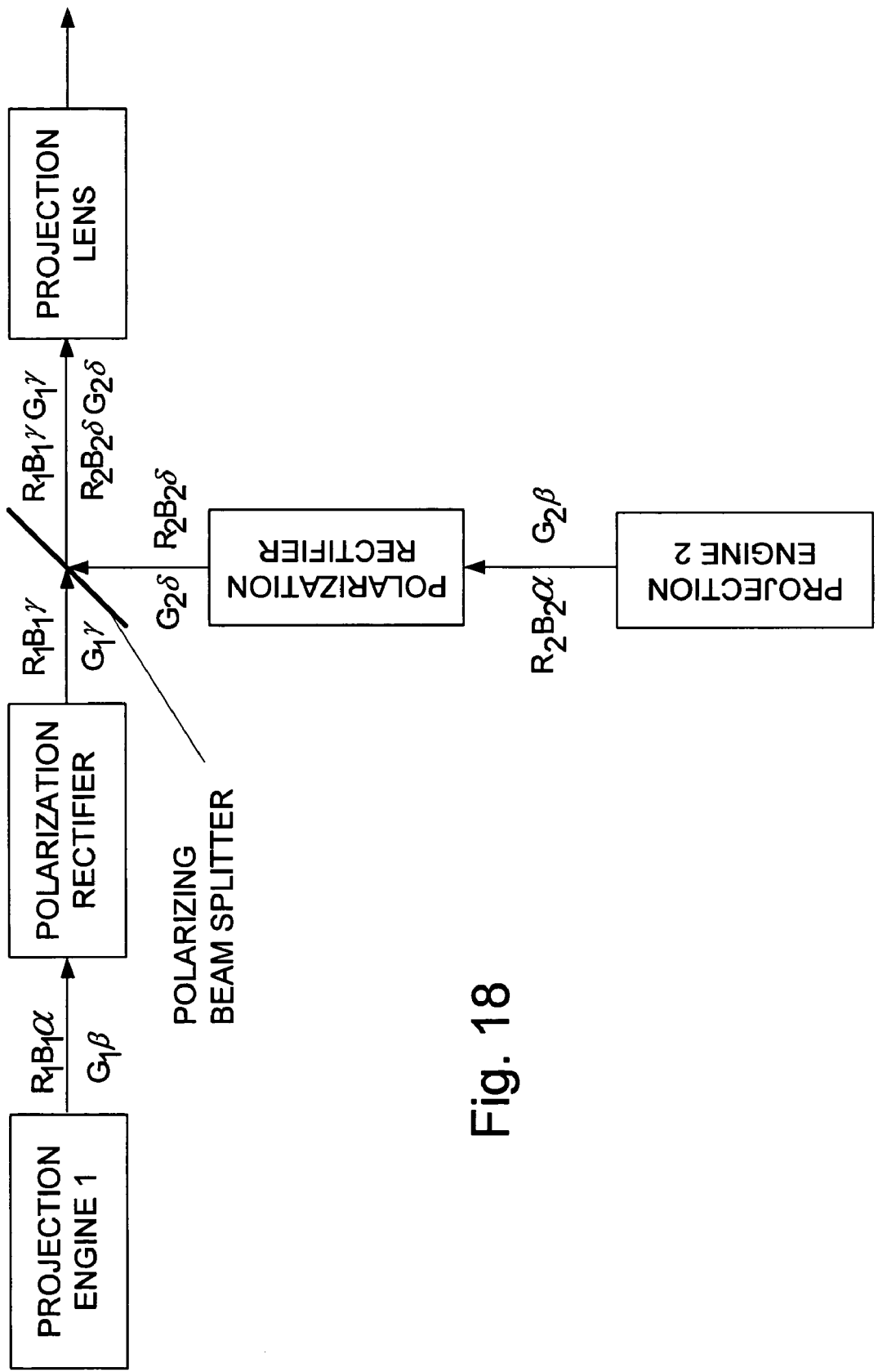
FIG. 18 shows a stereoscopic projection system with a single projection lens.

The two polarization rectifiers filter lends itself to an efficient combining of its output beams by a polarization beam splitter. A polarization beam splitter is a device that transmits one polarization state while reflecting the orthogonal polarization state. It can be used to combine the two output beams of the filter into a single co-axial beam because these beams have well defined and mutually orthogonal polarizations. Combining the two outputs of the filter is particularly useful for creating a stereoscopic projection unit with a single projection lens, as shown in FIG. 18.

While the invention has been described with respect to several preferred embodiments, it will be appreciated that these are set forth merely for purposes of example, and that many other variations, modifications and applications of the invention may be made.

What is claimed is:

1. Stereoscopic display apparatus comprising:
   first and second projectors having inputs connectable to a source of digital data representing the color components of color sets of two stereoscopic images, each of said projectors having an output outputting an optical beam having a set of color components in which at least one color component of each color set is of an orthogonal polarization state with respect to the other color components of the respective set;
   a polarization preserving screen;
   a first optical polarization rectifier using exclusively optical retarders to manipulate said polarization states in said first projector in such manner that the polarization states of the different color components in said first projector are converted to a single first polarization state;
   a second optical polarization rectifier using exclusively optical retarders to manipulate said polarization states in said second projector in such manner that the polarization states of the different color components in said first projector are converted to a second single polarization state;
   said first and second single polarization states being mutually orthogonal;
   polarizing clean-up filters arranged for increasing the polarization ratio of the output beams;
   and stacking means for stacking said two color sets onto said polarization preserving screen such as to enable stereoscopic viewing of the two color sets via orthogonally polarized filters.

2. The apparatus according to claim 1, wherein the color components in the outputs of each projector are red, green and blue, and the polarization of the green component is orthogonal to the polarizations of the red and the blue components.

3. The apparatus according to claim 2 wherein the said color components in the output of each projector are linearly polarized.

4. The apparatus according to claim 3 wherein each of said optical polarization rectifiers contains a stack of optical retarders that rotates the polarization of the green component while leaving the polarization states of the red and blue components intact.

5. The apparatus according to claim 4 wherein said first polarization rectifier further contains ½ wave retarder to rotate the polarization state outputted by its stack of optical retarders to make it parallel to said first polarization state and said second polarization rectifier further contains a ½ wave retarder to rotate the polarization state outputted by its stack of optical retarders to make it parallel to said second polarization state.

6. The apparatus according to claim 5, wherein said first and second polarization states are linear.

7. The apparatus according to claim 5, wherein said first and second polarization states are circular.

* * * * *